US006956941B1

(12) United States Patent
Duncan et al.

(10) Patent No.: US 6,956,941 B1
(45) Date of Patent: Oct. 18, 2005

(54) METHOD AND SYSTEM FOR SCHEDULING INBOUND INQUIRIES

(75) Inventors: Daniel N. Duncan, Austin, TX (US); Alexander N. Svoronos, Austin, TX (US); Thomas J. Miller, Westfield, NJ (US)

(73) Assignee: Austin Logistics Incorporated, Austin, TX (US)

( * ) Notice: Subject to any disclaimer, the term of this patent is extended or adjusted under 35 U.S.C. 154(b) by 508 days.

(21) Appl. No.: 09/547,627

(22) Filed: Apr. 12, 2000

(51) Int. Cl.[7] ............................................. H04M 3/00
(52) U.S. Cl. .......................... 379/265.01; 379/265.02; 379/266.01
(58) Field of Search ..................... 379/67.01, 207.14, 379/207.15, 210.01, 265.01, 265.02, 265.09, 379/266.01, 309, 900, 88.18, 88.17

(56) References Cited

U.S. PATENT DOCUMENTS

| | | | | |
|---|---|---|---|---|
| 4,881,261 A | * | 11/1989 | Oliphant et al. | 379/215.01 |
| 5,040,208 A | * | 8/1991 | Jolissaint | 379/210.01 |
| 5,185,782 A | * | 2/1993 | Srinivasan | 379/210.01 |
| 5,291,550 A | * | 3/1994 | Levy et al. | 379/242 |
| 5,335,269 A | * | 8/1994 | Steinlicht | 379/266.01 |
| 5,627,884 A | * | 5/1997 | Williams et al. | 379/88.16 |
| 5,742,674 A | * | 4/1998 | Jain et al. | 379/210.01 |
| 5,838,682 A | * | 11/1998 | Dekelbaum et al. | 370/401 |
| 5,946,386 A | * | 8/1999 | Rogers et al. | 379/265.01 |
| 6,002,760 A | * | 12/1999 | Gisby | 379/266.01 |
| 6,088,444 A | * | 7/2000 | Walker et al. | 379/266.01 |
| 6,154,530 A | * | 11/2000 | Letellier | 379/142 |

OTHER PUBLICATIONS

Lucent's CentreVu® Advocate[SM] white paper; "Lucent's CentreVu Advocate, Breakthrough Solutions for your Success"; Lucent Technologies.

CentreVu® Advocate[SM] Research Simulation white paper; "CentreVu Advocate Research Simulation, Environments with CentreVu Advocate"; Lucent Technologies.
CentreVu® Advocate; "Powerful Call Center Routing That Leaves *Nothing* to Chance"; Lucent Technologies.
Foster, Robin Harris and De Reyt, Stanny; "Re-inventing the Call Centre with Predictive and Adaptive Execution"; Lucent Technologies.
"C@ll Center Solutions—1998 Product of the Year"; http://www.praxon.com/news/art_2-99prodofyear.htm, Feb. 1999.
"Choosing the Best: *CTI*®Magazine's 1998 Products of the Year"; http:/www.tmcnet.com/articles/ctimag/0199/ctipoty98.htm.

* cited by examiner

*Primary Examiner*—Bing Q. Bui
(74) *Attorney, Agent, or Firm*—Hamilton & Terrile, LLP; Robert W. Holland (57) ABSTRACT

A method and system schedules inbound inquiries, such as inbound telephone calls, for response by agents in an order that is based in part on the forecasted outcome of the inbound inquiries. A scheduling module applies inquiry information to a model to forecast the outcome of an inbound inquiry. The forecasted outcome is used to set a priority value for ordering the inquiry. The priority value may be determined by solving a constrained optimization problem that seeks to maximize an objective function, such as maximizing an agent's productivity to produce sales or to minimize inbound call attrition. The inbound call may be placed on a virtual hold or be responded to on a real-time basis based on the inbound inquiry's priority value. A modeling module generates models that forecast inquiry outcomes based on a history and inquiry information. Statistical analysis such as regression analysis determines the model with the outcome related to the nature of the inquiry. Forecasted outcomes are based on the goal of the inbound calls and include factors such as probability an inbound caller will hang up, probability that an inbound caller will alter a business relationship based on hold time, probability that an inbound caller will make a purchase, and the relative probable reward of responding to an inbound call.

43 Claims, 2 Drawing Sheets

METHOD AND SYSTEM FOR SCHEDULING INBOUND INQUIRIES

TECHNICAL FIELD

This invention relates in general to the fields of telephony and computer networks, and more particularly to a method and system for scheduling inbound inquires made by telephone or by other electronic messages.

BACKGROUND OF THE INVENTION

Telephone calling centers represent the front line for customer service and marketing operations of many businesses. Typical calling centers receive or make hundreds of telephone calls per day with the aid of automated telephony equipment. With the Internet growing in importance as a way of communicating with customers, calling centers have also evolved to send and respond to electronic messages, such as e-mail or instant messages.

Calling centers often play a dual role of both sending outbound inquiries and answering inbound inquiries. For instance, calling centers use predictive dialers that automatically dial outbound telephone calls to contact individuals and then transfer the contacted individuals to agents when the individual answers the phone. Inbound telephone calls by individuals to the calling center are received by telephony equipment in the calling center and distributed to agents as the agents become available. Calling centers often combine outbound and inbound functions as a way to improve the talk time efficiency of calling center agents. Thus, for instance, when inbound calls have expected hold times that are acceptable, agents may be reassigned to place outbound telephone calls to help ensure that the agents are fully occupied.

One important goal for calling centers that receive inbound inquiries, such as telephone calls or electronic message inquiries, is to transfer the inbound inquiries to appropriate agents as quickly and efficiently as possible. A variety of telephone call receiving devices are commercially available to help meet this goal. One such receiving device is an automatic call distribution system ("ACD") that receives plural inbound telephone calls and then distributes the received inbound calls to agents based on agent skill set, information available about the caller, and rules that match inbound callers to desired queues. Inbound calls may be routed to different queues based on rules and data, allowing a basic prioritization of inbound calls. For example, inbound callers seeking information about a new credit card account might be assigned to a different queue than inbound callers having questions about their account balances. Once assigned to a queue, calls in that queue are generally handled in a first-in-first-out basis. Thus, a caller's hold time generally depends upon the caller's depth in the queue.

Another type of call receiving device is a voice response unit ("VRU"), also known as an interactive voice response system. When an inbound call is received by a VRU, the caller is generally greeted with an automated voice that queries for information such as the caller's account number. Information provided by the caller is typically used to route the call to an appropriate queue. VRUs are used in conjunction with ACDs, but also improve performance of less complex receiving devices such as PBX systems.

As telephony migrates from conventional telephone signals to the use of Internet based computer networks, voice over internet protocol ("VOIP") will become an increasingly common platform for handling inbound telephone calls. One advantage of VOIP is enhanced access to account information for inbound calls with improved speed and accuracy. For example, conventional ACD and VRU systems collect caller information when inbound calls are received. One example of such caller information is automated number identification ("ANI") information provided by telephone networks that identify the telephone number of the inbound call. Another example is destination number identification system information ("DNIS") which allows the purpose of the inbound call to be determined from the telephone number dialed by the inbound caller. Using this caller information and account information gathered by a VRU or ACD, conventional calling centers are able to gather information on the caller and provide that information to the agent. The use of VOIP improves the integration of data and telephony by passing both data and telephony through a network with internet protocol and by combining voice inquiries with electronic message inquiries, such as e-mail. One example of such integration is the Intelligent Contact Management ("ICM") solution sold by CISCO Systems, Inc. Another example is the integrated response systems available from eShare Technologies, described in greater detail at www.eShare.com.

Although telephone receiving devices provide improved distribution of inbound telephone calls to agents, the receiving devices are generally not helpful in managing hold times when the number of inbound calls exceeds the agent answering capacity. For instance, customers tend to make inbound calls for service at similar times. A large volume of inbound calls tends to lead to longer wait times during popular calling periods resulting in customer dissatisfaction. As a consequence, during periods of heavy volumes and long hold times, a greater number of inbound callers hang up or "silently" close their accounts by seeking other service providers with better service. Another example of excessive hold times affecting the behavior of inbound callers occurs with telemarketing. The volume of inbound calls in a marketing operation tends to increase dramatically shortly after a television advertisement is aired. Extended hold times result in a greater number of customer hang-ups and lost sales.

SUMMARY OF THE INVENTION

Therefore a need has arisen for a method and system which orders inbound inquiries, such as telephone calls, to improve the efficiency of responding to the inbound inquiries.

A further need exists for a method and system that forecasts the behavior of those making inbound inquiries, such as inbound telephone callers, to predict the outcome of an inbound inquiry.

A further need exists for a method and system that applies the forecasted behavior of those making inbound inquiries, such as inbound telephone callers, to order the inbound inquiries for response by agents.

A further need exists for a method and system that solves for an optimum ordering sequence for responding to inbound inquiries.

In accordance with the present invention, a method and system for ordering inbound inquiries is provided that substantially eliminates or reduces disadvantages and problems associated with previously developed methods and systems for responding to inbound inquiries. Inbound inquiry information associated with each inbound inquiry is applied to a model to determine a priority value for ordering the inbound inquiry for response relative to other inbound inquiries.

More specifically, inbound inquiries may include inbound telephone calls, e-mails, instant messages, or other electronic messages formats, such as those available through the internet. In an embodiment for scheduling inbound telephone calls, a telephone call receiving device receives plural inbound telephone calls for distribution to one or more agents. The telephone call receiving device may include an ACD, a VRU, a PBX, a VOIP server or any combination of such devices that are operable to receive plural inbound telephone calls and redirect the inbound telephone calls to one or more agents. The inbound telephone calls have associated caller information, such as ANI or DNIS information, which the receiving device interprets. ANI information identifies the telephone number from which the inbound call originates, and DNIS information identifies the telephone number to which the inbound call was directed.

A scheduling module interfaced with or integrated within the receiving device determines an order for the handling of inbound telephone calls based in part on the predicted outcome of the inbound telephone calls. In one embodiment, the scheduling module places the inbound calls in a queue, the queue acting as a virtual hold, and applies a caller model to the caller information associated with the inbound calls in order to forecast the predicted outcome of the inbound calls. The order for handling the inbound calls is based on a priority value calculated from the application of a caller model to the caller information by a call evaluation sub-module and based on the capacity of the receiving device. As calls are scheduled by the scheduling module for handling by the receiving device, the scheduling module releases the inbound calls from the virtual hold queue and places the inbound calls in the queue of the receiving device. In an alternative embodiment, the scheduling module or the receiving device may perform real-time scheduling of inbound call inventory by re-ordering queues of the receiving device based on the priority value.

The call evaluation sub-module uses algorithms and models provided by a modeling module that analyzes inbound call histories to forecast outcomes of pending inbound calls. It utilizes the forecasts to compute priority values. For example, in the modeling module, performing logistic regression on prior inbound calls using caller and/or call information and prior call history as independent (or predictive) variables and a dependent variable of caller attrition, provides a model that forecasts pending inbound caller attrition based on the caller and/or call information. Alternatively, performing linear regression modeling on prior inbound calls, using caller and/or call information as independent (or predictive) variables and a dependent variable of connect time, provides a model that forecasts the expected agent talk time for each incoming call.

Predictive variables for the logistic and linear regression equations may include call information such as the originating number or exchange, the originating location, the dialed number, the time of day and the likely purpose of the call. In addition, they may include caller information such as account information derived from association of the originating number and an account data base, or derived from data input by the inbound caller by a VRU. From caller information and/or call information, additional predictive variables are available for forecasting the outcome of the inbound call, including demographic information that may be associated with the call and/or caller.

In one embodiment, the call evaluation sub-module estimates one or more quantities of interest with one or more models provided by the modeling module, and computes the call's priority value based on the quantities of interest. For example, the call value of "the probability of a sale per minute of expected talk time" may be estimated by dividing the estimated probability of a sale by the estimated talk time.

In another embodiment, the call evaluation sub-module uses the estimated quantities of interest to formulate and solve a constrained optimization problem based on conventional mathematical techniques, such as the simplex method for linear problems or the Conjugate gradient and Projected Lagrangian techniques for Non-linear problems. For example, call evaluation sub-module may present a value that represents the solution to maximizing objectives such as agent productivity to either minimize attrition or to produce product sales.

The present invention provides a number of important technical advantages. One important technical advantage is that inbound inquiries, such as inbound telephone calls, are ordered for response based at least in part on the predicted outcome of the inbound inquiries. This allows, for instance, agents to respond to customers that are more sensitive to holding time before responding to customers who are less sensitive to holding time. This also allows, as another example, enhanced efficiency of handling of inbound telephone calls by seeking to improve the overall outcomes of the inbound calls based on the forecasted outcomes. For instance, in a telemarketing environment, inbound callers with a higher likelihood of purchasing an item or service may be responded to before customers with a lower probability of a purchase outcome. In fact, computing estimated outcomes and then formulating and solving the appropriate constrained optimization problem provides an ordering sequence that maximizes purchases made by inbound callers responding to a television advertisement.

Another important technical advantage of the present invention is that forecasted outcomes are available with minimal caller information. Generally the identity and purpose of inbound calls are difficult to discern because little information is available regarding the inbound caller. The use of statistical analysis of historical inbound calling data allows accurate modeling of outcomes with minimal knowledge of the identity and purpose of the inbound caller.

Another important technical advantage of the present invention is that inbound calls are prioritized based on caller and call information. The present invention allows flexible use in a number of inbound inquiry environments such as telemarketing and customer service environments. Caller models may have different predictive variables depending upon the modeled outcome and the caller information obtained with the inbound inquiry. For instance, telemarketing applications using models that forecast probability of a purchase may focus on predictive variables derived from demographic information based on the origination of the inbound call. In contrast, customer service applications using models that forecast caller attrition may have more detailed predictive variables derived from customer account information. Thus, inbound calling models and objectives may be closely tailored to a user's particular application. Also, estimates of the inbound call talk time may lead to constrained optimization solutions designed to maximize the use of the available agent talk time. Further, an overall response strategy that accounts for electronic message inquiries as well as telephone inquiries is more easily adopted.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the FIGURES, like numeral being used to refer to like and corresponding parts of the various drawings.

Under normal circumstances, inbound telephone calling centers maintain holding times for inbound callers within desired constraints by adjusting the response capacity of the calling center. For instance, during projected or actual periods of heavy inbound calling volume, additional agents may be assigned to respond to inbound calls by adding agents to the calling center or by reducing the number of outbound calls. However, once the overall capacity of a calling center is reached, inbound calls in excess of calling center capacity will generally result in increased holding times for the inbound callers.

Inadequate capacity to handle inbound calls may result from periodic increases in the number of inbound calls during popular calling times, or may result from one time surges due to factors such as system-wide customer service glitches or the effects of advertising. Generally, the excess inbound calls are assigned to hold for an available agent in queues of an inbound telephone call receiving device and are handled on a first-in first-out basis for each holding queue. Often, the result of excessive hold times is that customers having a greater sensitivity to long hold times will hang-up in frustration.

Responding to holding inbound callers on a first-in-first-out basis does not necessarily provide the most efficient results for a calling center. Agent time is used most efficiently when an agent is responding to inbound callers most likely to achieve a desired outcome. For instance, in a telemarketing role an agent is most productive when speaking with inbound callers likely to purchase the marketed service or product. Similarly, in a customer service role, an agent is most productive when speaking with inbound callers who provide a greater rate of profitability to the calling center. Thus, routing calls to agents on a first-in-first-out basis does not provide the most efficient use of agent time when inbound callers having a higher probability of a desired outcome are treated in the same manner as inbound callers having a lower probability of a desired outcome. The same principle applies when inbound inquiries are received in alternative formats, such as e-mail or instant messages.

Figure 1:
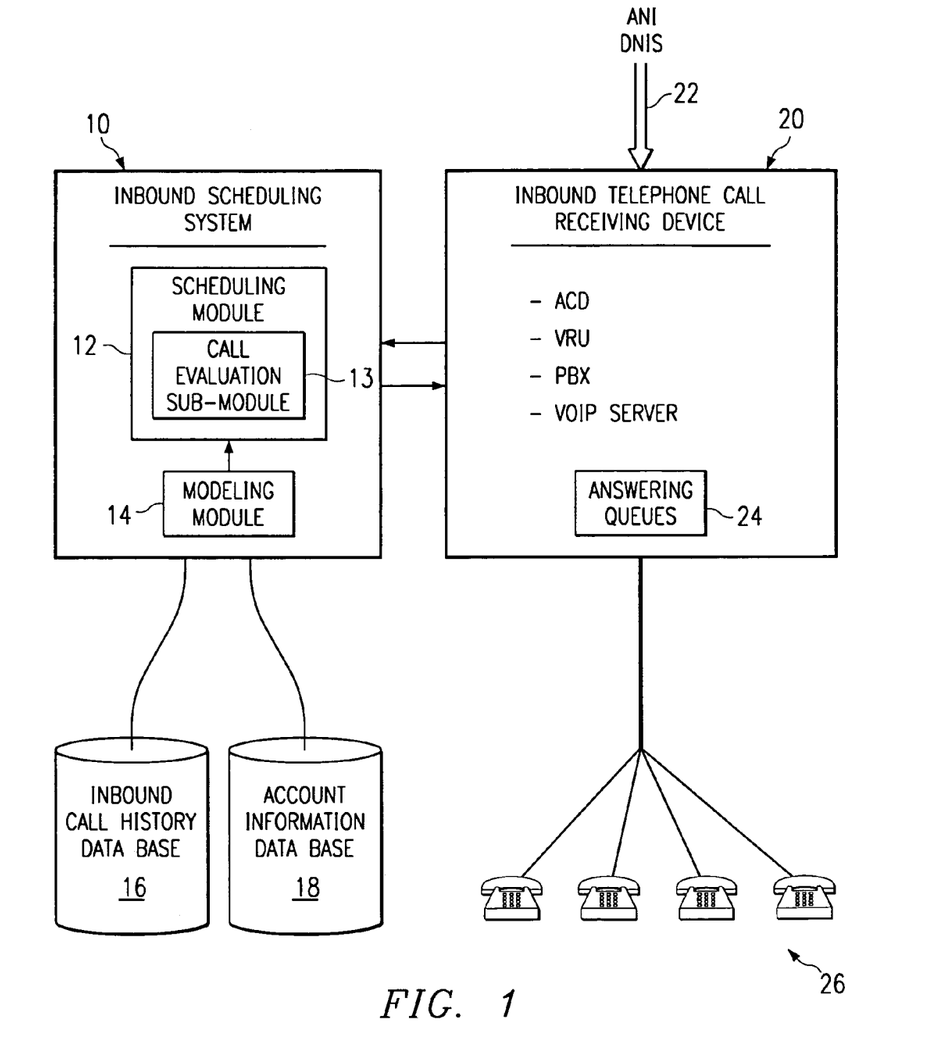
FIG. 1 depicts a block diagram of an inbound telephone call receiving device interfaced with an inbound scheduling system.

Referring now to FIG. 1, a block diagram depicts an inbound scheduling system 10 that schedules inbound telephone calls for response by agents in an order based in part on the predicted outcome of the inbound telephone calls. Inbound scheduling system 10 includes a scheduling module 12, a call evaluation sub-module 13, and a modeling module 14, and is interfaced with an inbound call history data base 16 and account information data base 18. Modeling module 14 builds one or more models that forecast the outcomes of inbound calls using inbound call history from data base 16 and/or from account information of data base 18. Scheduling module 12 applies the models to forecast outcomes of pending inbound calls and schedules an order for agents to respond to the pending inbound calls based on the call evaluation sub-module 13. Modeling module 14 builds statistical models and call evaluation sub-module 13 computes the priority value which is used by scheduling module 12. The priority value is the result of computations based on the models, but also of solutions to optimization problems that may be defined on computations based on the models.

Inbound scheduling system 10 interfaces with an inbound telephone call receiving device 20. Scheduling system 10 and receiving device 20 may be integrated in a single computing platform, or may be based on separate computing platforms interfaced with proprietary application programming interfaces of the receiving device 20 or interfaced with commercially available application middle ware such as Dialogic's CT Connect or Microsoft's TAPI. Inbound telephone call receiving device 20 is a conventional telephony device that accepts inbound telephone calls through a telephony interface 22, such as conventional T1 or fiber interfaces. Inbound telephone call receiving device 20 may include an ACD, a VRU, a PBX, a VOIP server or any combination of such conventional devices. Inbound telephone calls received through interface 22 are distributed to one or more answering queues 24 for response by agents operating telephony devices 26. Although FIG. 1 depicts an embodiment of the present invention that orders inbound telephone calls, alternative embodiments apply scheduling module 12 and modeling module 14 to schedule other types of inbound inquiries, such as e-mail or instant message inquiries, by interfacing inbound scheduling system 10 with an appropriate inbound receiving device, such as an internet server.

Inbound telephone call receiving device 20 accepts inbound telephone calls through interface 22 and obtains caller information associated with the inbound calls such as ANI and DNIS information. When receiving device 20 includes a VRU, additional caller information, such as account information, is obtained through automated interaction with the inbound callers. For instance, a VRU may query an inbound caller to provide an account number or a reason for the call, such as to open a new account, to change account information, to check account information, to purchase a particular service or item, or to collect inbound caller information when ANI is not operative, such as when caller-ID is blocked. In an alternative embodiment, inbound inquiries may include e-mail or instant messages that provide inquiry information based on login ID, e-mail address, IP or instant message address. In such an embodiment, additional information can be gathered by an automated e-mail or instant message survey response that requests a phone number, purchase interest, account number or other relevant information.

Receiving device 20 passes the caller information to scheduling system 10, such as through a data query, and awaits a response from scheduling system 10 before allocating the inbound call to an answering queue. In addition, receiving device 20 provides scheduling system 10 with agent activity and capacity. For instance, a receiving device 20 may include both a VRU and an ACD with the ACD providing agent activity information. When receiving device 20 includes a VRU, an "out of order" response may be provided by scheduling system 10 when operator capacity is unavailable or in high use, meaning that the first call in is not necessarily the first call out.

Scheduling module 12 keeps inbound calls in a queue that acts as a virtual hold until a response is desired and then releases the inbound call for placement in an answering queue 24. Thus, scheduling system 10 responds to queries from receiving device 20 based on the priority of the inbound call, essentially creating an ordered queue on receiving device 20 by delaying the response to inbound calls having lower priorities. In one alternative embodiment, scheduling module 12 may re-order queues directly within receiving device 20 to allow real-time ordering of inbound telephone call queues.

Scheduling module 12 obtains data to apply to a caller model by performing a look-up based on the caller information received from receiving device 20. Caller information may include account number, zip code, area code, telephone exchange, reservation number or other pertinent information obtained from the inbound caller, such as with a VRU, or derived from information obtained by the receiving device 20 with the inbound call, such as ANI or DNIS information. The nature of caller information depends upon the implementation of scheduling system 10 and is generally configurable through a graphical user interface provided with conventional receiving devices. In addition to the caller information, scheduling module 12 may query and join data from other sources such as zip+4 and credit bureau sources and demographic information otherwise derivable from the caller information.

When sufficient capacity exists for response by receiving device 20, scheduling system 10 releases calls immediately back to receiving device 20. In other words inbound calls are not delayed if sufficient capacity exists to handle the inbound calls, but are routed for immediate answering. When capacity is tight on receiving device 20, calls are delayed on a virtual hold by scheduling system 10 until an appropriate time based on the priority value computed by the call evaluation sub-module 13. Whether or not inbound calls are delayed, scheduling system 10 gathers and stores data for the inbound calls in the inbound call history data base 16. The outcome of inbound calls is also gathered and stored along with forecasted outcomes to provide a detailed call-by-call history for use in future modeling and for verification of forecasted outcome versus actual outcome. For instance, once an inbound call is completed, results such as a successful connect with an agent, an abandoned call, a purchase, or customer attrition from billing records are associated with inbound calls.

Modeling module 14 creates caller models by performing statistical analysis on appropriate data taken from inbound call history data base 16 and account information data base 18. The statistical analysis performed by modeling module 14 builds models by associating the outcome of a call (i.e., the dependent variable) to the information available when the call is received (i.e., the independent variables) The end result of each model is equations that when computed provide a forecast for the outcome of interest (e.g., agent talk time, sale: yes/no, account cancelled within x days: yes/no). The application of caller models to caller and/or call information may be performed as calls arrive, or may be performed preemptively to calculate potential scores in the beginning of a time period to provide more rapid response when circumstances warrant.

One type of statistical analysis appropriate for modeling discrete outcomes (e.g., sale: yes/no, account cancelled within x days: yes/no) is logistic regression. Some examples of forecasted outcomes include estimating probability an inbound caller will hang up in a predetermined hold time, the probability a customer will cancel an account, or the probability the customer will make a purchase. As an example, the following logistic regression equation forecasts the probability of purchase based on the independent variables income and age:

$$\exp(a_0+a_1*age+a_2*income)/[1+\exp(a_0+a_1*age+a_2*income)]$$

where:
$a_0$=a constant representing the model's intercept
$a_1$=the parameter for the predictive variable age
$a_2$=the parameter for the predictive variable income Another type of statistical analysis appropriate for modeling continuous outcomes, such as talk time or sale amount, is linear regression. For example, the following linear regression equation forecasts agent talk time ("TT") based on independent variables time-on-books ("TOB"), time-of-day between 8–9 am ("TOD"), balance ("BAL") and delinquency level ("DL"):

$$TT=b_0+b_1TOB+b_2TODflag+b_3BAL+b_4DL$$

$b_0$=a constant representing the model's intercept
$b_1$=the parameter for the predictive variable TOB
$b_2$=the parameter for the predictive variable TOD
  (i.e., Was the call between 8–9 (1=yes, 2=no))
$b_3$=the parameter for the predictive variable BAL
$b_4$=the parameter for the predictive variable DL In alternative embodiments, statistical models that forecast outcomes may be developed by a number of alternative techniques. For instance, neural networks, classification and regression trees (CART), and Chi squared automatic detection (CHAID) are statistical techniques for modeling both discrete and continuous dependent variables. Another example is cluster analysis, which, with an association of the resulting cluster assignment equations to the dependent variables allows for simplified models or may be used to improve the effectiveness of other techniques. Each alternative statistical technique will result in different forecasting equations which may have advantages for different types of forecasting circumstances. Essentially, however, each type of equation will associate an outcome as a dependent variable with the call and caller information available while the call is processed as independent variables. In general mathematical terms, for each possible discrete outcome, such as sale: yes/no, account cancelled within x days: yes/no, where i=1, . . . M:

$$Prob(outcome=i)=f_i(x(1), x(2), \ldots x(N))$$

where:
x(i) stands for the ith independent variable, and
$f_i(x(1), x(2), \ldots x(N))$ stands for the modeling equation for outcome i and can take different forms depending upon the statistical technique chosen For each continuous outcome, such as talk-time or amount of sale:

$$\text{Estimate of dependent variable}=g(x(1), x(2), \ldots x(N))$$

where:
x(i) stands for the ith independent variable, and
$g(x(1), x(2), \ldots x(N))$ stands for the modeling equation, and can take different forms depending upon the statistical technique chosen.

Forecasted outcomes and predictive variables are user defined, and depend on the inbound inquiries being scheduled. As an example, for inbound inquiries related to a solicitation effort, such as telephone calls following a TV advertisement, the outcome may be: yes/no/hang-up; amount of purchase (continuous); amount by type of product (continuous) split by product type; approval of a credit application yes/no. As another example, for customer service inquiries, exemplary outcomes may be: customer satisfaction yes/no; closure of account within x days yes/no; change in loan balance within x days (continuous); or dispute with a positive resolution/dispute with a negative resolution/no dispute. Other types of outcomes that may be of interest to both post-solicitation and customer service inquiries include: agent talk-time (continuous); agent talk time by type of agent (continuous split by agent type, such as general/supervisor/specialist).

The selection of predictive variables depends upon the type of data available and the circumstances of the outcome which is being forecasted. For example, in a situation in which the inquiries come from individuals known to the calling center, data available for predicting outcomes may include: account information; application information, such as employment, age, income, bank account information; relationship data such as other account information; results of other modeling efforts, such as behavior and response scores; credit bureau data; check clearing data; e-mail domain information; and trigger events, such as solicitations, TV advertisements, and account statements. When geographic location of the call or caller can be established, this may yield additional predictive data, such as zip+4 credit bureau information, census demographics, and third party models, such as credit bureau clusters. Data available from a call itself may include information input through a VRU, including branch sequence and initial number called, and the time at the place of the origination of the inbound inquiry. In addition, the call environment itself may provide data based on the types and number of calls received in a recent period of time, the type and number within a period of time, such as a particular hour or day, and the results provided by the calls.

Once the modeling equations are applied and outcomes such as probability of purchase or expected talk time are estimated, the call evaluation sub-module computes the priority value. In one embodiment of the invention, the priority value of a call might be the estimated probability of a purchase. Inbound calls having higher probabilities of purchase may be answered first. In another embodiment, the priority value of a call might be given by dividing the estimated probability of purchase by the expected talk time of the call. The most productive calls are given are given a greater priority value for response by an agent. In this way, agent productivity is implicitly improved since a greater portion of the agent's time is spent talking with potential customers having a higher probability of making a purchase.

In another embodiment of the invention, scheduling module 12 orders inbound inquiries to explicitly optimize a desired outcome, such as a maximum number of purchases or a minimum number or losses due to attrition, taking into account the limitations of the environment operating at the time. Quantities of interest, such as probability of a sale, probability of attrition, or expected talk time, are estimated with models generated by modeling module 14. The estimated quantities of interest are used to solve a constrained optimization problem with conventional mathematical techniques, such as the simplex method for linear problems or the Conjugate gradient and Projected Lagrangian techniques for Non-linear problems.

One example of optimization applied to inbound telephone calls is the maximization of agent productivity to minimize attrition of inbound callers, as illustrated by the following equation:

Max sum $x(i)*(p_2(i)-p_1(i))$ i=1, ... N

Subject to:

sum $x(i)*t(i) =< T$ i=1, ... N $x(i)$ in (0,1)

where:

x(i) (the decision variable) denotes whether call i should be kept or dropped $p_1(i)$ is the estimate for the probability of attrition for the caller's account if the call is not answered $P_2(i)$ is the estimate for the probability of attrition for the caller's account if the call is answered t(i) is the estimate of the expected talk-time for call i T is the total available Agent time for a user-defined time interval N is the number of calls in queue Once the constrained optimization problem is solved, letting Q be the optimal dual variable for the talk-time constraint, the call priority value may be given by the reduced objective value: $P_2(i)-P_1(i)-Q*t(i)$.

Another example of optimization applied to inbound telephone calls is the maximization of agent productivity to produce sales to inbound callers, as illustrated by the following equation:

Max sum $x(i)*q(i)$ i=1, ... N

Subject to:

sum $x(i)*t(i) =< T$ i=1, ... N x(i) in (0,1)

where:

x(i) (the decision variable) denotes whether call i should be kept or dropped q(i) is the estimate for the probability that the call will result in a sale t(i) is the estimate of the expected talk-time for call i T is the total available Agent time for a user-defined time interval N is the number of calls in queue.

Once the constrained optimization problem is solved, letting R be the optimal dual variable for the talk time constraint, the call priority value may be given by the reduced objective value: $q(i)-R*t(i)$.

Although FIG. 1 depicts an embodiment of the present invention that orders inbound telephone calls, alternative embodiments apply scheduling module 12 and modeling module 14 to schedule other types of inbound inquiries, such as e-mail or instant message inquiries, by interfacing inbound scheduling system 10 with an appropriate inbound receiving device, such as an internet server. The scheduling module may be receiving inbound inquiries from a plurality of sources (e.g. ACD, VRU, internet server) and returning priority values to unified or separate pools of agents.

Figure 2:
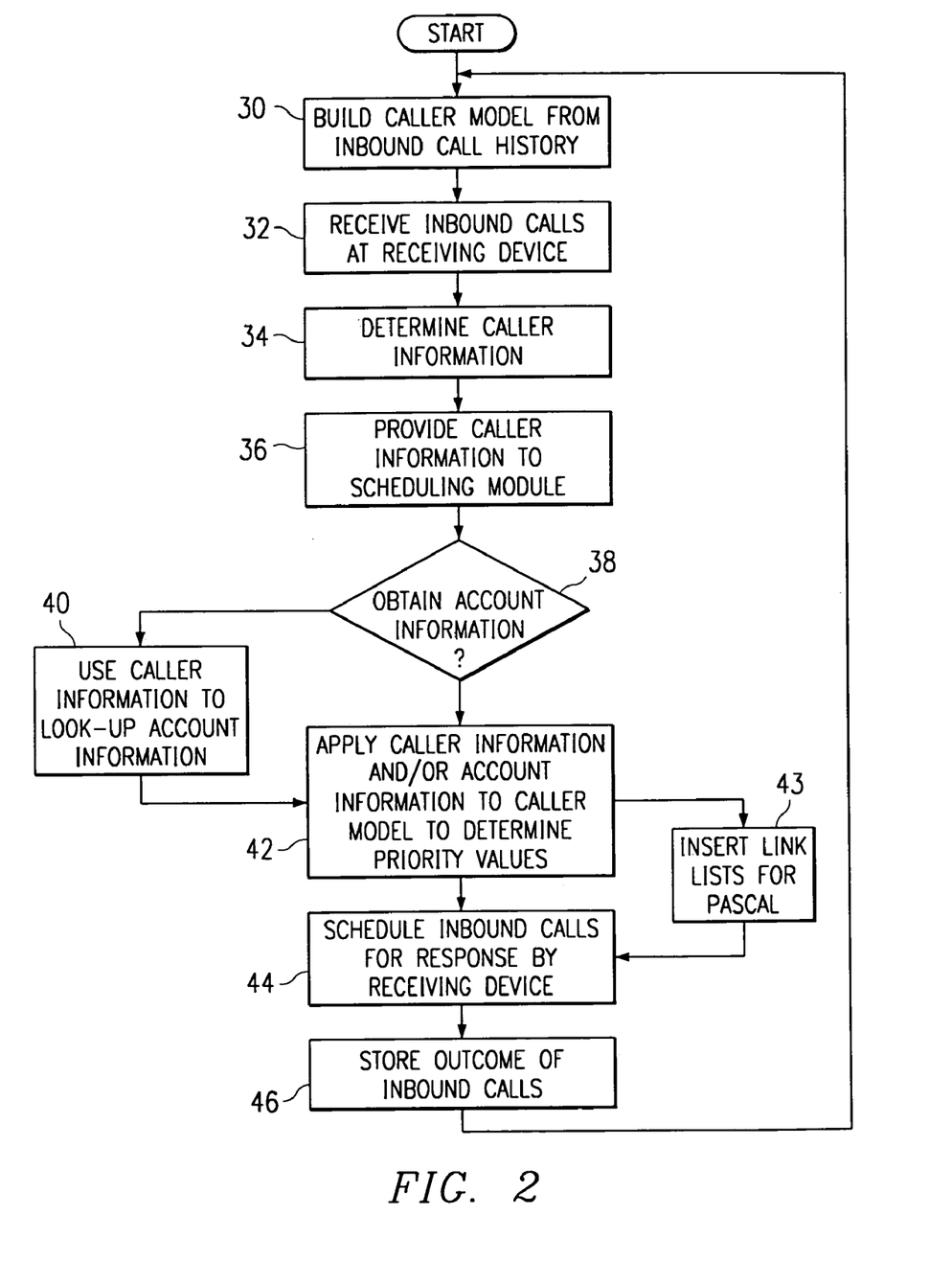
FIG. 2 depicts a flow diagram of a method for ordering inbound callers for response by agents.

Referring now to FIG. 2, a flow diagram depicts a process for scheduling inbound calls for response by an agent. The process begins at step 30 with the building of models from inbound call history. The inbound call history used to model the outcomes of interest may be a sample drawn from historical inbound calls of the same nature as the outcomes to be modeled or may be specifically designed during a test phase. For instance, a television advertisement aired in a single or limited number of television markets representative of the total targeted audience may be used to generate inbound calls having a volume within the capacity constraints of the calling center. The outcome of the inbound calls from the sample advertisement may then be used to create a model specific to the nature of the product sold by the advertisement. The advertisement-specific model is then used for the time periods during which the advertisement is presented to wider audiences so that inbound calls having a greater probability of resulting in a purchase will have a higher priority for response by an agent.

At step 32, inbound calls are received by the receiving device. Generally, inbound calls arrive continuously at the receiving device at rates that vary over time. The receiving device answers the inbound calls in a conventional manner and, at step 34, determines call and/or caller information. Call and/or caller information is determined through analysis of ANI or DNIS information that arrives with inbound calls and also through data gathering such as by interaction with a VRU.

At step 36, call and/or caller information is provided to the scheduling module for a determination of a priority value based on the forecasted outcome of the inbound call. At step 38, the scheduling module determines if additional information is needed for calculation of the outcome forecast. For instance, account information may be acquired by the receiving device and passed to the scheduling module, or the scheduling module can acquire all or part of the information. If additional information is needed, at step 40, caller information is used to obtain additional account or demographic information. At step 42, the caller model is applied to caller information, account information and/or demographic information to determine a priority value for the inbound call. At step 43, in one embodiment, the receiving device sorts queues according to the priority value, reducing or eliminating the need for a virtual hold by the release of calls from the scheduling module. For instance, a linked list for receiving devices that support lined list data structures may be used to aid in the scheduling of inbound calls.

At step 44, inbound calls are scheduled for response by an agent interfaced with the receiving device. Inbound calls having lower priority values are placed on virtual hold while inbound calls having higher priority values are returned to the receiving device and placed in a queue for response by an agent. The length of a virtual hold for an inbound call depends upon the volume of inbound calls, the capacity of the receiving device, the talk time of the agents per call and the priority value of an inbound call relative to other pending inbound calls. Based on these factors, an inbound call is placed in virtual hold time and is forwarded to the receiving device in priority value order when agent resources are available and/or when a maximize hold time parameter has been exceeded. Alternatively, in embodiments in which the receiving device can sort or change the order of an inbound queue based on available data including the priority value, the inbound queues of the receiving device may be re-ordered on a real-time basis as additional inquiries are received.

At step 46, the outcome of inbound calls is stored in the inbound call history data base. The inbound history data base tracks factors such as call success or abandonment and ultimate call outcome. Call outcome may include directly quantifiable factors such as a purchase decision or less quantifiable factors such as customer satisfaction as reflected by account usage, cancellations and related information that is derivable from account databases and other sources.

One example of an application of the inbound scheduling system is a credit card service calling center. Customers tend to make inbound calls at similar times of the day which leads to longer hold times when inbound call volumes are high. Often, inbound callers hang up or simply just "silently" close their account when hold times are excessive for that caller. Other customers are less sensitive to hold times and thus less likely to alter their purchasing habits or account status as a factor of hold times. The scheduling system enhances the overall benefit from inbound telephone calls by providing a higher priority to inbound calls that are forecasted to have a desired result, such as increased account usage. Further, the effectiveness may be tested with champion/challenger testing that compares results of subsets of inbound calls in which one segment is prioritized and the other segment is not prioritized or is prioritized with a different priority strategy.

Another example of the present invention is an application for an integrated response center that simultaneously accepts inquiries from different types of communication media, such as simultaneous inquires from telephone calls, VOIP, e-mails and instant messages. In such an environment, agent response to inquiries may be via the same media as the inquiry or through cross-channel communication. For instance, an e-mail inquiry may result in an e-mail response or, alternatively, in a telephone call response. Further, the priority of the response may depend, in part, on the media of the inquiry. For instance, generally an e-mail inquiry will have a lower priority than a telephone inquiry since a customer generally will not expect as rapid of a response when the customer sends an e-mail inquiry. However, if the customer who sent the e-mail inquiry has a high probability of purchase, an immediate response by a telephone call might provide a better sales outcome for an agent's time, even if a telephone inquiry with a customer having a low probability of purchase is left on hold while the agent places an outbound call.

In a highly constrained resource environment, particularly low priority inquiries, such as inquiries with a low probability of purchase, may be scheduled for outbound attempts at a later time in order to preserve response resources for higher priority inquiries. For instance, a low priority inbound telephone caller may be given a voice message that informs the caller of an excess wait time and that he will be contacted at a future time. The future time is determined by the caller's priority compared with the actual and projected priority of other inbound inquiries and the capacity of the agents to respond to the inquires. Thus, if the capacity of the available agents is projected to exceed inbound inquiry demand and higher priority inquiry backlog in two hours, the low priority inbound caller may be given a message to expect a call in two hours. Similarly, an automated e-mail message may be provided to an e-mail inquiry informing the e-mail inquirer that he may expect a response at a specific time. In this way, inquiries are scheduled for outbound contact attempts on a prioritized basis rather than on a first-in-first-out basis. In one alternative embodiment, the inquirer may be prompted for the best time and communication channel, and an outbound contact attempt will be attempted at that time.

Although the present invention has been described in detail, it should be understood that various changes, substitutions and alterations can be made hereto without departing from the spirit and scope of the invention as defined by the appended claims.

What is claimed is:

1. A method for ordering inbound inquiries, the method comprising:
   receiving plural inbound inquiries, each inbound inquiry having associated inquiry information;
   applying a model to the inquiry information to determine a priority value for each inquiry, the model estimating the probability of an outcome of an inbound inquiry having a predetermined result; and
   ordering the inbound inquiries with the priority values.

2. The method of claim 1 wherein the method inquiries comprise e-mail messages.

3. The method of claim 1 wherein the method inquiries comprise instant messages.

4. The method of claim 1 wherein the inbound inquiries comprise inbound telephone calls having associated caller information.

5. The method of claim 4 wherein the caller information comprises automatic number identification information.

6. The method of claim 4 wherein the caller information comprise destination number identification information.

7. The method of claim 4 further comprising:
   gathering the caller information with a voice response unit.

8. The method of claim 4 further comprising:
   associating demographic information with each inbound telephone call based on the caller information of the inbound call; and
   applying the model to the caller information to determine the priority value for each telephone call.

9. The method of claim 4 wherein the model predicts caller behavior.

10. The method of claim 9 wherein the priority value comprises a probability that the telephone call will result in a purchase.

11. The method of claim 9 wherein the priority value comprises a probability that the caller associated with the telephone call will terminate the call after a hold time.

12. The method of claim 1 further comprising:
    developing plural models from a history of inbound inquiries to forecast plural outcomes that determine the priority value.

13. The method of claim 12 wherein developing the model further comprises:
    applying regression analysis to the history to calculate the priority value.

14. The method of claim 12 further comprising:
    determining the outcomes of the plural inbound inquiries; and
    updating the history with the outcomes of the plural inbound inquiries.

15. The method of claim 12 wherein developing the caller model further comprises:
    updating the model with the updated history.

16. A method for determining inbound telephone call priority, the method comprising:
    developing one or more models from a history of inbound calls, the history having caller information and outcome results from inbound telephone calls;
    applying the model to caller information of a pending inbound call to predict an outcome of the pending inbound call; and
    associating a priority with the pending inbound call, the priority based on the predicted outcome.

17. The method of claim 16 wherein the caller information comprises telephony information received with the pending inbound call.

18. The method of claim 17 wherein the telephony information comprises automatic number identification information.

19. The method of claim 17 wherein the telephony information comprises destination number identification information.

20. The method of claim 17 wherein the caller information further comprises account information, the method further comprising:
    obtaining account information for the pending inbound call, the account information stored in a database by association with the telephony information.

21. The method of claim 17 wherein the telephony information further comprises information input by the caller through a voice response unit.

22. The method of claim 21 further comprising:
    obtaining account information for the pending inbound call based on the telephony information.

23. The method of claim 16 wherein developing a model further comprises:
    using the caller information as predictive variables that model outcome results.

24. The method of claim 23 wherein the model comprises a logistic regression model.

25. The method of claim 23 wherein the model comprises a linear regression model.

26. The method of claim 16 further comprising:
    placing the pending inbound call in the queue of an automatic call distribution system in an order based on the priority of the pending inbound call.

27. The method of claim 26 wherein the predicted outcome comprises a purchase resulting from the pending inbound call.

28. The method of claim 26 wherein the predicted outcome comprises the hold time of the pending inbound call.

29. The method of claim 16 wherein associating a priority further comprises optimizing the order for the inbound telephone calls.

30. The method of claim 29 wherein optimizing the order comprises solving a constrained optimization problem using one or estimates from one or more models.

31. The method of claim 29 wherein optimizing further comprises maximizing agent productivity to minimize caller attrition.

32. The method of claim 29 wherein optimizing further comprises maximizing agent productivity to produce sales.

33. A system for scheduling inbound calls, the system comprising:
    a receiving device operable to receive plural inbound inquiries and to provide the inbound inquiries to one or more agents; and
    a scheduling module interfaced with the receiving device, the scheduling module operable to order the inbound inquiries for handling by the receiving device, the order based in part on the predicted outcome of the inbound inquiries.

34. The system of claim 33 wherein the inbound inquiries comprise inbound telephone calls.

35. The system of claim 33 wherein the receiving device comprises an automatic call distribution system.

36. The system of claim 33 wherein the receiving device comprises a server that supports voice over internet protocol.

37. The system of claim 33 wherein the receiving device comprises a voice response unit.

38. The system of claim 34 further comprising:
an inbound call history data base operable to store outcome results and caller information from plural completed inbound calls; and
a modeling module interfaced with the history database and operable to model inbound call outcomes from the stored outcome results and caller information.

39. A system for responding to inbound calls, the system comprising:
a telephone call receiving device interfaced with a network to receive plural inbound calls; and
a scheduling system associated with the receiving device and having a scheduling module that prioritizes the inbound calls in accordance with forecasted outcomes for the inbound calls;
wherein the scheduling system places one or more inbound calls on hold and then releases the inbound call from hold based on the priority of the inbound call.

40. The system of claim 39 wherein the telephone call receiving device comprises an automatic call distribution system that incorporates the scheduling system.

41. The system of claim 39 wherein the scheduling system forecasts outcomes with a model derived from a history of inbound calls.

42. The system of claim 39 wherein the scheduling system orders the inbound calls to optimize an objective function.

43. The system of claim 42 wherein the objective function comprises agent productivity to minimize inbound call attrition.

\* \* \* \* \*